(12) United States Patent
Noto

(10) Patent No.: US 7,471,477 B2
(45) Date of Patent: Dec. 30, 2008

(54) OPTICAL APPARATUS

(75) Inventor: Goro Noto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 761 days.

(21) Appl. No.: 10/972,619

(22) Filed: Oct. 25, 2004

(65) Prior Publication Data

US 2005/0088562 A1    Apr. 28, 2005

(30) Foreign Application Priority Data

Oct. 27, 2003  (JP) ............................. 2003-365464

(51) Int. Cl.
```
G02B 5/04      (2006.01)
G02B 3/00      (2006.01)
G02B 13/16     (2006.01)
H04N 5/22      (2006.01)
```
(52) U.S. Cl. ................... 359/834; 359/834; 359/737; 348/335; 348/333.08

(58) Field of Classification Search ............... 396/373, 396/377; 348/335, 208.8; 356/19, 339; 359/514, 359/496, 431, 351, 833, 834, 835, 836, 837, 359/438, 831, 479, 737; 353/81, 33
See application file for complete search history.

(56) References Cited

U.S. PATENT DOCUMENTS 4,119,980 A * 10/1978 Baker ......................... 396/351
6,067,195 A * 5/2000 Hirunuma et al. ........... 359/557
6,259,564 B1 7/2001 Kamo
6,314,247 B1 * 11/2001 Mogamiya et al. .......... 396/384
2002/0075449 A1 * 6/2002 Strahle ....................... 351/205
2005/0041133 A1 * 2/2005 Weigel ........................ 348/335

FOREIGN PATENT DOCUMENTS

| JP | 2000-338403 A | 12/2000 |
| JP | 2002-040361 A | 2/2002 |
| JP | 2002-350930 A | 12/2002 |

* cited by examiner

Primary Examiner—Lin Ye
Assistant Examiner—Euel K Cowan
(74) Attorney, Agent, or Firm—Canon USA Inc I P Div

(57) ABSTRACT

An optical apparatus including an optical system for bending an optical path in a first direction into a second direction substantially perpendicular to the first direction; and a prism for bending the optical path in the second direction with a plurality of reflecting surfaces so that the optical path spirals and leads into a third direction substantially perpendicular to the second direction.

3 Claims, 8 Drawing Sheets

OPTICAL APPARATUS

This application claims priority from Japanese Patent Application No. 2003-365464 filed Oct. 27, 2003, which is hereby incorporated by reference herein.

BACKGROUND OF THE INVENTION

1. Field of the Invention

The present invention relates to an optical apparatus that changes the optical path of incident light and allows the light to exit.

2. Description of the Related Art

An optical apparatus such as an analog camera (silver salt film camera) and a digital camera is difficult to reduce in the size, especially in the thickness. One of the reasons is the optical viewfinder. Hitherto, various viewfinders have been proposed in order to reduce the overall size or the thickness of cameras.

For example, Japanese Patent Laid-Open No. 2000-338403 discloses a real-image-type viewfinder in which the axis of light entering an objective lens is not parallel to the axis of light exiting an eyepiece lens. According to this related art, the axis of light exiting an eyepiece lens system is tilted with respect to the axis of light entering an objective lens system; an image inverting system is composed of a single roof prism only; and the optical axis is bent in the same plane. Therefore, the mechanism of the viewfinder is simplified and miniaturized.

In addition, Japanese Patent Laid-Open No. 2000-155357 discloses a viewfinder optical system in which a reflecting optical subsystem includes a plurality of free-form reflecting surfaces having power; and at least one of the reflecting surfaces satisfies the following condition:

$$5° < |\theta| < 25°$$

where $\theta$ is an angle of reflection of an axial chief ray with respect to the normal. In this related art, attention is directed to a reflecting surface (hereinafter referred to as independent reflecting surface) that does not function as a transmitting surface and has an unlimited angle of reflection. If the reflecting optical subsystem includes at least one independent reflecting surface, it is possible to reduce the angle of reflection of the independent reflecting surface and consequently reduce the decentration aberration even if the independent reflecting surface has strong power. The reflecting optical subsystem bends the optical path effectively, so reduction in the size of the viewfinder is achieved.

Moreover, Japanese Patent Laid-Open No. 2002-350930 discloses a viewfinder system and an optical apparatus using the same. The viewfinder system includes a first reflecting surface for bending a light path disposed between lenses in an objective lens subsystem; and an image-inverting optical subsystem having a roof reflecting-surface. This viewfinder system achieves a reduction in thickness by bending the optical path at an obtuse angle with a mirror having the first reflecting surface.

The above related arts achieve miniaturization by folding an optical axis of a viewfinder in the same plane. Unlike these, for example, Japanese Patent Laid-Open No. 2002-040361 discloses a display in which an optical axis of a viewfinder is bent in two parallel planes so that an image from a single display element can be seen with both eyes. According to this related art, a three-dimensional optical-path splitting section splits an image from a single display element into light rays for the left eye and light rays for the right eye, and then allows the light rays to enter eyepiece prisms for the left eye and the right eye, respectively. Therefore, an image from a single display element can be led to both eyes without reduction of intensity of the image.

However, the above related arts have the following problems. In the first related art, since the objective lens system and the eyepiece lens system of the viewfinder are arranged in the thickness direction of the camera, reduction in the thickness is difficult. In the second related art, instead of providing an objective lens subsystem having power, the reflecting optical system including reflecting surfaces having power is provided. Therefore, in the case of an optical zoom viewfinder, a lens system for zooming is necessary. The lens system for zooming prevents reduction in the thickness of the optical apparatus such as a camera. In the third related art, in the case of a camera having the viewfinder system, the objective system of the viewfinder extends in the width direction of the camera. Therefore, reduction in the width of the camera is difficult. In the fourth related art, in the case of an optical zoom viewfinder, reduction in the thickness of the optical apparatus such as a camera is prevented, as in the second related art.

As described above, it is difficult to reduce the thickness or the overall size of the optical apparatus, such as a camera, having a viewfinder.

SUMMARY OF THE INVENTION

It is an object of the present invention to miniaturize optical apparatus.

To attain this object, the present invention is an optical apparatus including an optical system for bending an optical path in a first direction into a second direction substantially perpendicular to the first direction; and a prism for bending the optical path in the second direction with a plurality of reflecting surfaces so that the optical path spirals and leads into a third direction substantially perpendicular to the second direction.

The present invention reduces the height and the thickness of a prism to provide a thin and compact optical apparatus. In addition, the user can easily look through an eyepiece lens, and the parallax in the optical apparatus is small. The present invention is applicable to a viewfinder for a camera and an optical apparatus having the viewfinder.

Further objects, features and advantages of the present invention will become apparent from the following description of the preferred embodiments (with reference to the attached drawings).

DESCRIPTION OF THE PREFERRED EMBODIMENTS

Embodiment 1

Figure 1:
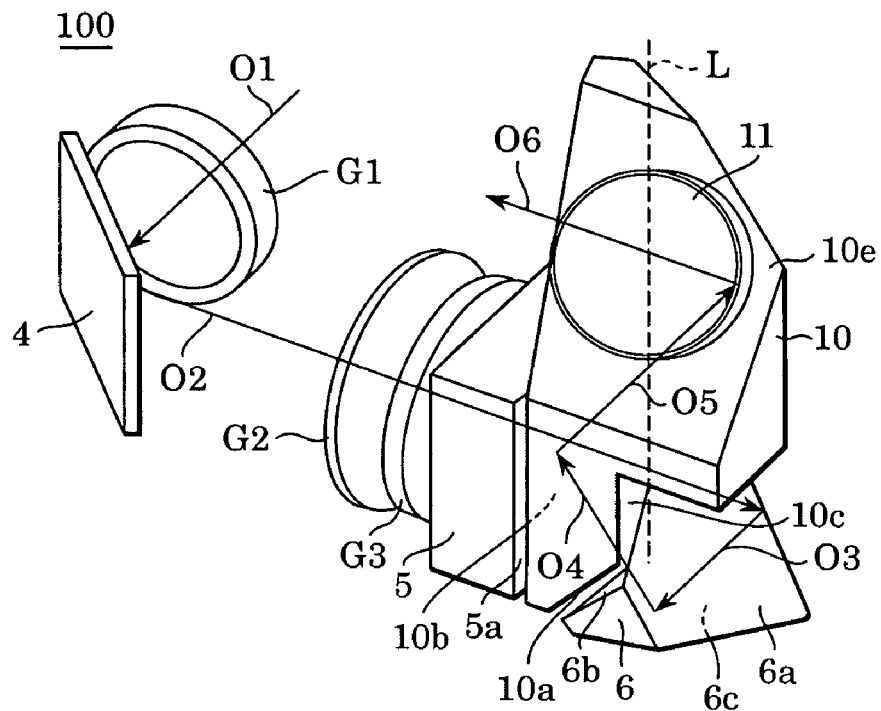
FIG. 1 is a perspective view showing a viewfinder according to embodiment 1 of the present invention, the viewfinder being in wide-angle mode.
Figure 2:
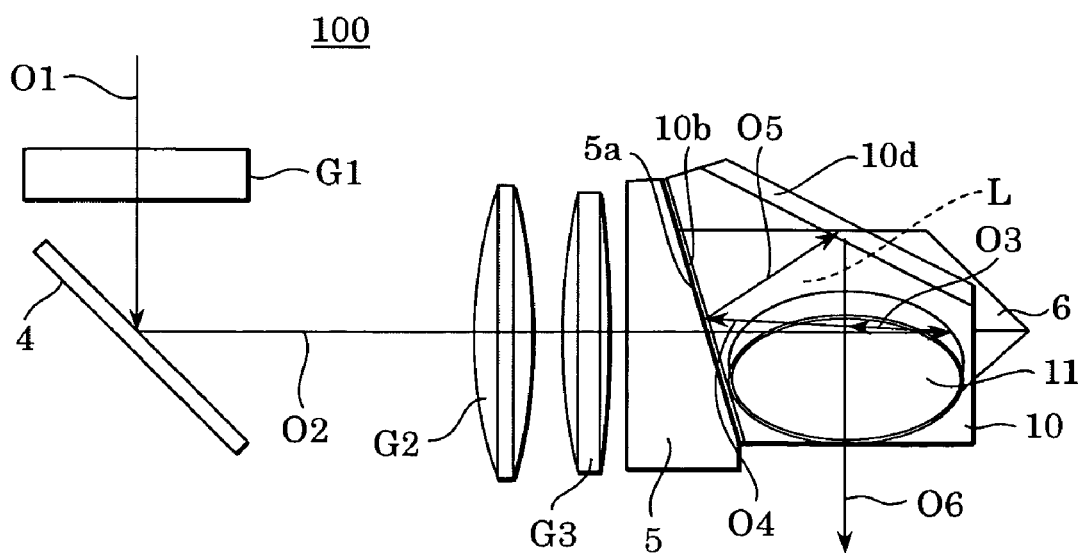
FIG. 2 is a top view showing the viewfinder according to embodiment 1 of the present invention.
Figure 3:
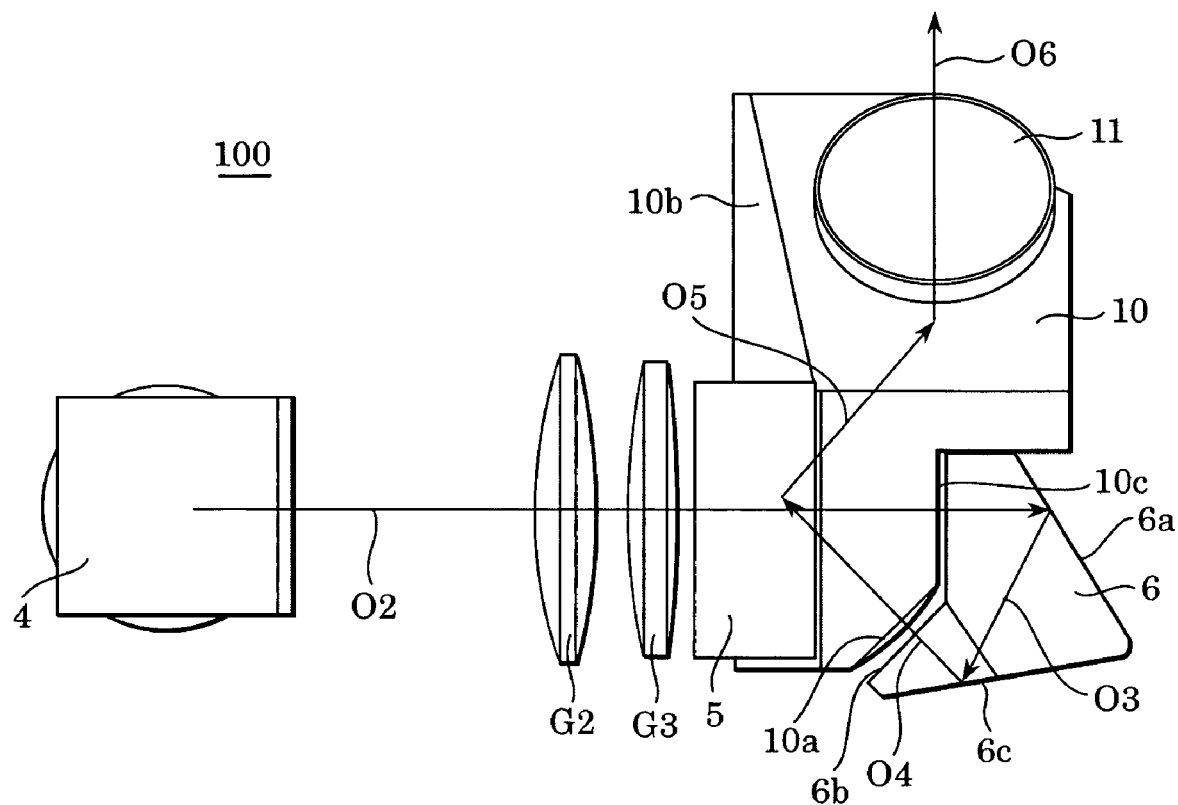
FIG. 3 is a front view showing the viewfinder according to embodiment 1 of the present invention.
Figure 4:
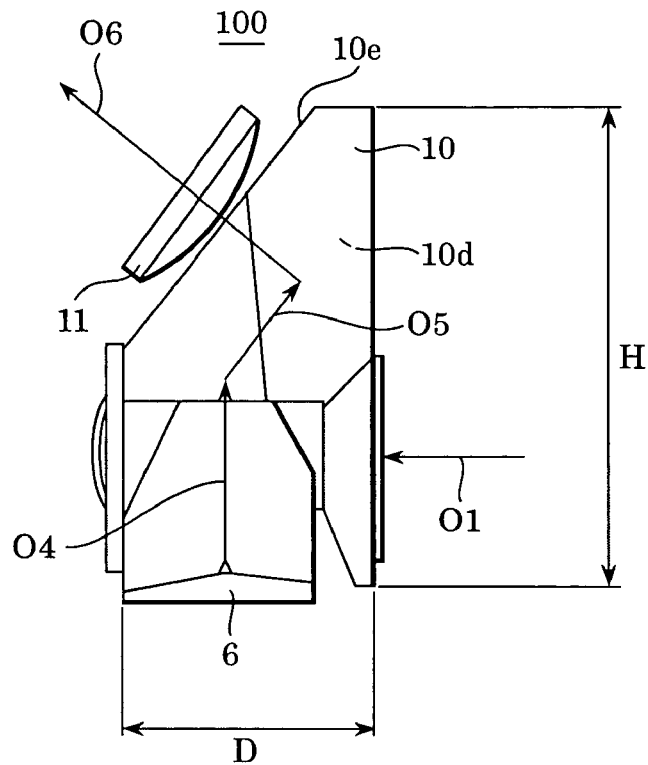
FIG. 4 is a right side view showing the viewfinder according to embodiment 1 of the present invention.
Figure 5:
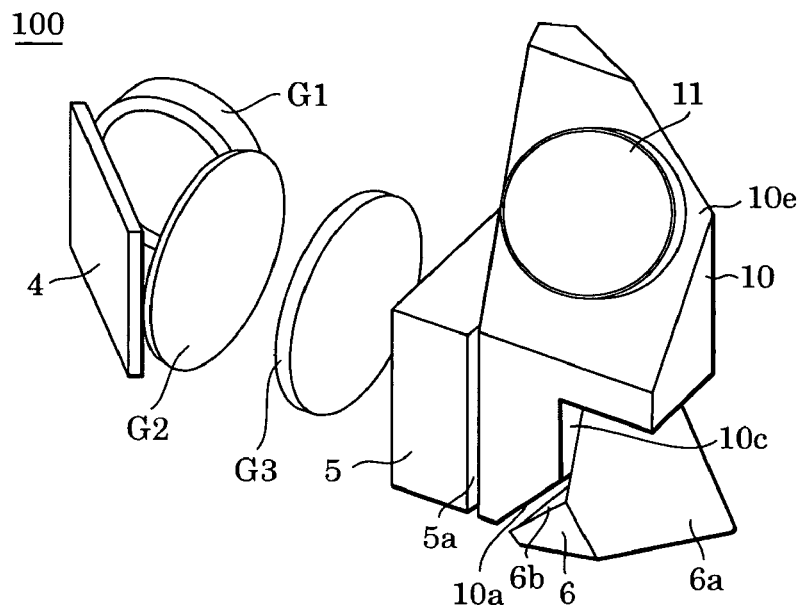
FIG. 5 is a perspective view showing the viewfinder according to embodiment 1 of the present invention, the viewfinder being in telephoto mode.

FIGS. 1 to 5 illustrates a viewfinder 100 according to embodiment 1 of the present invention. More specifically, FIG. 1 is a perspective view of the viewfinder in wide-angle mode; FIG. 2 is a top view of the viewfinder; FIG. 3 is a front view of the viewfinder; FIG. 4 is a right side view of the viewfinder; and FIG. 5 is a perspective view of the viewfinder in telephoto mode. The viewfinder of embodiment 1 is a zoom viewfinder, as is clear from the relationship between FIGS. 1 and 5.

In FIGS. 1 to 5, reference character G1 denotes a fixed objective lens; reference characters G2 and G3 denote objective lenses capable of moving in the direction of the optical axis for zooming; and reference numeral 4 denotes a mirror for bending the optical path. Reference numeral 5 denotes an objective prism. The objective prism 5 has a tilted surface 5a. The tilted surface 5a has the same angle as a tilted surface 10b of an eyepiece prism 10, and the air gap between the tilted surfaces 5a and 10b is very small so that an object image goes approximately straight when the object image enters the eyepiece prism 10 through the tilted surface 10b. Reference numeral 6 denotes a bending prism having a roof surface 6a. The bending prism 6 converts the object image into an erect image in cooperation with the eyepiece prism 10.

The above optical elements (G1 to G3 and 4 to 6) compose an objective optical system. The roof surface 6a and a bending surface 6c of the bending prism 6 are metal reflective surfaces evaporated with aluminum.

Reference numerals 10 and 11 denote optical elements composing an eyepiece optical system. Reference numeral 10 denotes an eyepiece prism for leading the object image from the objective optical system to an eyepiece lens 11. As shown in FIG. 4, the eyepiece lens 11 is tilted. The plane between the objective optical system and the eyepiece optical system, that is to say, the plane between the exit surface 6b of the bending prism 6 and the entrance surface 10a of the eyepiece prism 10 is the primary image-forming plane, which is the object-image forming plane of the objective optical system. The plane is provided with a field frame (not shown).

The optical path may be bent by the mirror 4 in the opposite direction. That is to say, the layout of the above components may be a mirror-image layout symmetrical to the layout in FIG. 1. Holding members for holding the objective lenses G1 to G3 and the mirror 4, a driving device necessary for zooming the objective lenses G2 and G3, and so on are omitted to simplify the drawing.

Next, with reference to FIGS. 1 to 5, embodiment 1 of the present invention will be described in detail.

The light from an object enters the objective lens G1 via a protective window (not shown). Reference character O1 denotes the optical axis at this time. The light from the object exits the objective lens G1 and is then bent by the mirror 4. Reference character O2 denotes the optical axis at this time.

The light from the object bent by the mirror 4 enters the objective lenses G2 and G3, and then enters the objective prism 5. The light from the object entering the objective prism 5 exits through the tilted surface 5a of the objective prism 5, and then enters the eyepiece prism 10 through the tilted surface 10b. As described above, the tilted surfaces 5a and 10b have the same angle, and the air gap between them is very small. Therefore, the light from the object goes approximately straight and enters the eyepiece prism 10 through the tilted surface 10b.

The light from the object entering the eyepiece prism 10 exits through a surface 10c of the eyepiece prism 10, and then enters the bending prism 6. The light from the object is bent by the roof surface 6a and is laterally inversed, and then goes to the bending surface 6c. Reference character O3 denotes the optical axis at this time. The object image is vertically inverted by the bending surface 6c, and then exits the bending prism 6 through the exit surface 6b. The object image enters the eyepiece prism 10 again through the entrance surface 10a of the eyepiece prism 10 and the field frame (not shown) disposed in the primary image-forming plane. Reference character O4 denotes the optical axis at this time.

The light from the object again entering the eyepiece prism 10 goes along the optical axis O4 toward the tilted surface 10b. The angle of the bending prism 6 and the angles of the entrance surface 10a and the tilted surface 10b of the eyepiece prism 10 are determined optimally so that the light from the object is totally reflected by the tilted surface 10b. Therefore, all of the light from the object is bent by the tilted surface 10b. Reference character O5 denotes the optical axis at this time.

The light from the object totally reflected by the tilted surface 10b goes to the tilted surface 10d through the eyepiece prism 10. The angle of the tilted surface 10d is determined optimally so that the light from the object is totally reflected by the tilted surface 10d. Therefore, all of the light from the object is bent by the tilted surface 10d. Reference character O6 denotes the optical axis extending toward the eyepiece lens 11 at this time. The light from the object totally reflected by the tilted surface 10d exits through a tilted surface 10e, and then enters the eyepiece lens 11. Therefore, the user can observe the object image through the eyepiece lens 11.

Here, the optical axes O4, O5, and O6 in the eyepiece prism 10 will be described. Herein, the light ray that enters through the center of the objective lens G1 and exits through the center of the eyepiece lens 11 is referred to as the main optical axis. Therefore, the optical axes O1 to O6 are parts of the main optical axis.

Figure 6A:
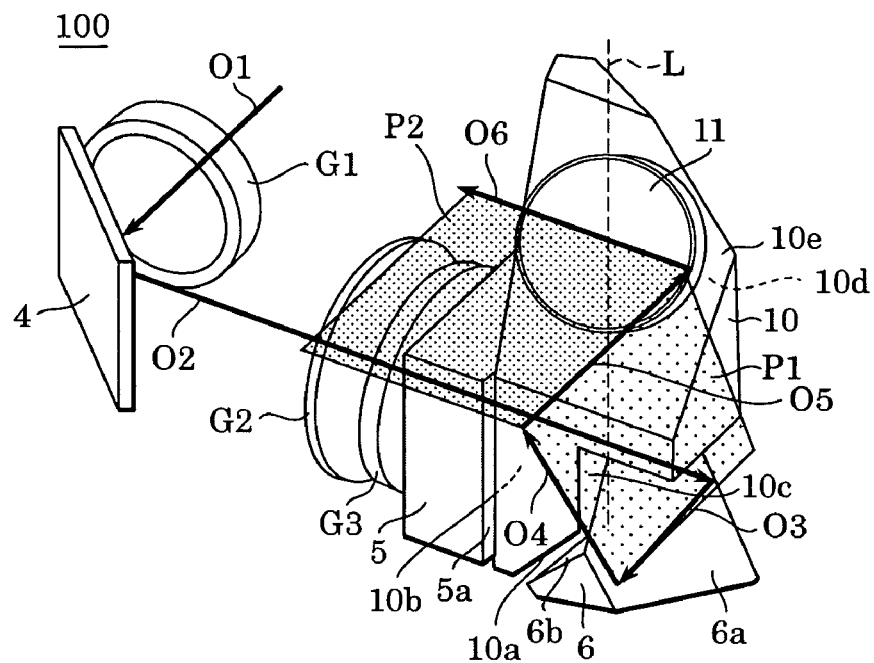
FIGS. 6A and 6B illustrate the relationship between main optical axis entering an objective optical system and planes including main optical axis in an eyepiece prism in embodiment 1 of the present invention.
Figure 6B:
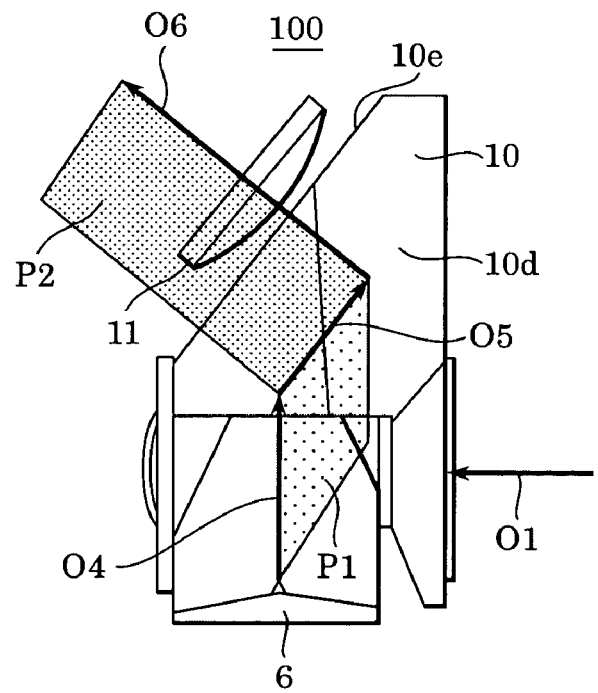

In FIGS. 1 and 2, the axis L is an imaginary axis that extends through the eyepiece prism 10 and is perpendicular to the optical axes O1 and O2. As shown in FIGS. 1 and 2, the optical axes O4, O5, and O6 form a spiral that winds around the axis L in the eyepiece prism 10, and then enter the eyepiece lens 11. In other words, as shown in FIGS. 6A and 6B, when the light from the object is reflected by the tilted surfaces of the eyepiece prism 10, the plane including the main axis incident on a tilted surface and the main axis reflected by the tilted surface, for example, the plane P1 including the optical axes O4 and O5, is tilted with respect to the optical axes O1 and O2, which enter the objective optical system. That is to say, the plane P1 is neither parallel nor perpendicular to the optical axes O1 and O2.

The plane P2 including the optical axes O5 and O6 is also tilted with respect to the optical axes O1 and O2.

In the case where the length of the optical path from the field frame (not shown) disposed in the primary image-forming plane to the eyepiece lens 11 via the eyepiece prism 10 is a fixed value, spiraling the optical path in the eyepiece prism 10 as described above can reduce the height H and the thickness D (see FIG. 4) of the eyepiece prism 10 compared with folding the optical path in the plane parallel or perpendicular to the optical axes O1 and O2 entering the objective optical system.

Next, the case where an optical apparatus, such as a digital camera, has the above viewfinder will be described.

Figure 7:
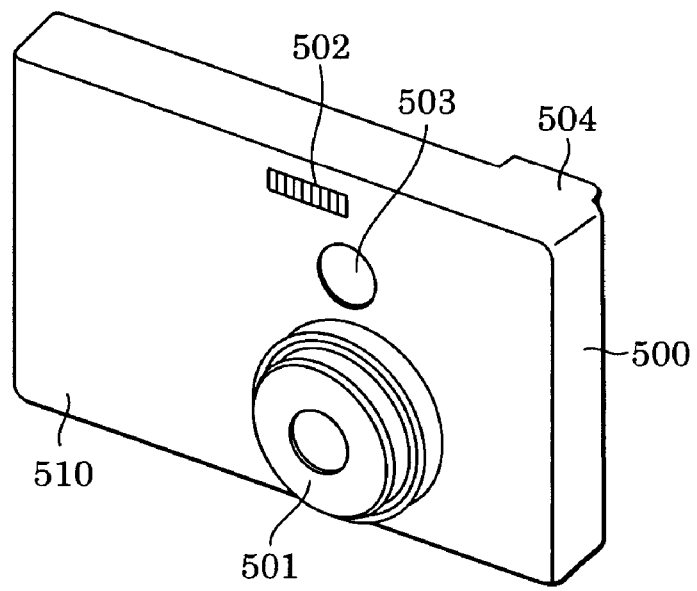
FIG. 7 is an overall perspective view showing an optical apparatus having the viewfinder according to embodiment 1 of the present invention.

FIG. 7 is a perspective view of an apparatus 500 having the viewfinder 100. In FIG. 7, reference numeral 501 denotes an image-taking device for taking an image of an object. The image-taking device 501 is composed of a plurality of optical elements and either a CCD or a silver salt film (not shown). Reference numeral 502 denotes a strobe light; reference numeral 503 denotes a viewfinder window for taking an image of the object; and reference numeral 504 denotes an eyepiece section for observing the image of the object. In addition, reference numeral 510 denotes a cover of the optical apparatus 500.

Figure 8:
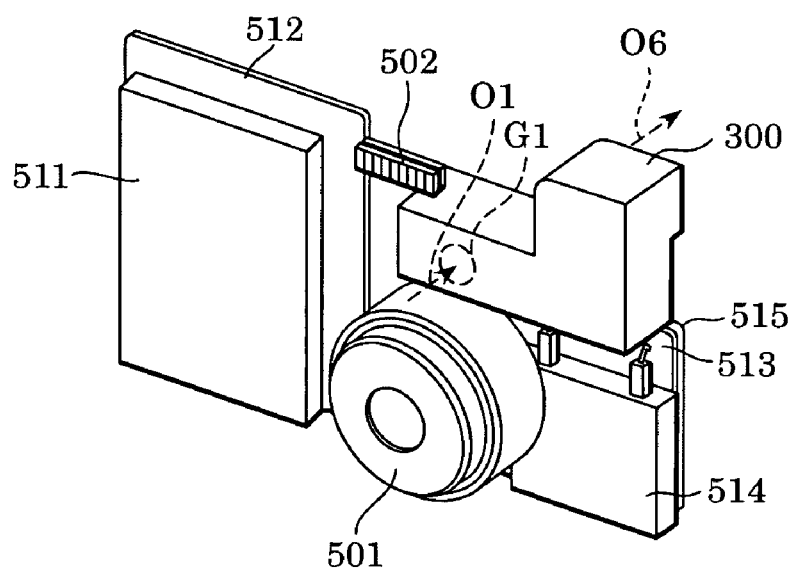
FIG. 8 is a perspective view showing main parts of the optical apparatus in FIG. 7 with the cover removed.

FIG. 8 is a perspective view showing main parts of the optical apparatus 500 with the cover 510 removed. In FIG. 8, reference numeral 511 denotes a battery, which is a power supply of the optical apparatus 500; reference numerals 512 and 513 denote boards provided with control circuits for controlling the optical apparatus 500; reference numeral 514 denotes a main capacitor for flashing the strobe light 502; and reference numeral 515 denotes a display such as an LCD for displaying the image of the object being taken by the image-taking device 501. In addition, reference numeral 300 denotes the schematically depicted viewfinder 100.

A case where an optical apparatus, such as a digital camera, has the viewfinder 100 (300) will be described with reference to FIGS. 7 and 8.

In the case of a compact optical apparatus 500, normally, the user looks through the eyepiece section 504 with the right eye. Therefore, the eyepiece section 504 is preferably disposed on the right side of the optical device 500 when viewed from the image-taking device 501. Therefore, as shown in FIG. 8, the viewfinder 300 is disposed above the image-taking device 501. As shown with the dashed line, the objective lens G1 is disposed above the image-taking device 501, and a mirror (not shown) bends the light from the object in the opposite direction from the direction shown in FIGS. 1 to 6. The eyepiece prism 10 composing the eyepiece optical system and the bending prism 6 are disposed on the right side of the optical apparatus 500. Therefore, the user can easily look through the eyepiece section 504. In addition, since the distance between the image-taking device 501 and the objective lens G1 is short, the parallax between the viewfinder 300 and the image-taking device 501 is small. Moreover, since the miniaturization of the viewfinder 300 itself can be achieved as described above, the optical apparatus 500 can be miniaturized (both in the width and in the thickness) compared with the conventional apparatus.

Disposing the main capacitor 514 and the display 515 under the viewfinder 300 makes it possible to dispose the battery 511 in the space on the left side of the optical apparatus 500 in FIG. 8. Since the left side space is provided mainly with the battery 511 and the board 512, the size of the battery 511 can be increased. Therefore, the operation time of the optical apparatus 500 can be increased. That is to say, the display can operate for a longer time; and many more images can be taken with the optical apparatus 500. This makes the optical apparatus 500 more user-friendly.

As described above, the main optical axis O4 is incident on the surface 10b; the main optical axis O5 is reflected by the surface 10b and is incident on the surface 10d; and the main optical axis O6 is reflected by the surface 10d. Both the plane P1 including the main optical axes O4 and O5 and the plane P2 including the main optical axes O5 and O6 are not parallel to the main axes O1 and O2 entering the objective optical system. In other words, the main axes O4, O5, and O6 incident on and reflected by the reflecting surfaces of the eyepiece prism 10 form a spiral that winds around the imaginary axis L perpendicular to the main axes O1 and O2 entering the objective optical system. Therefore, the height H and the thickness D of the eyepiece prism 10 can be reduced, and consequently the viewfinder according to embodiment 1 is thin and compact.

As shown in FIG. 4, since the eyepiece lens 11 is tilted toward the eyepiece prism 10, the eyepiece lens 11 does not project in the thickness direction from the eyepiece prism 10, as in the conventional apparatus. Therefore, the apparatus, such as a camera, having the viewfinder can be reduced in thickness.

By optimizing the angles of the tilted surfaces of the eyepiece prism 10 and the angle of the eyepiece lens 11, the reflecting surfaces of the eyepiece prism 10 can totally reflect the light from the object. In this case, the reflecting surfaces need not be evaporated with aluminum. Therefore, the cost can be reduced compared with the conventional viewfinders.

When the tilted surface 10b of the eyepiece prism 10 functions as the objective optical system, the tilted surface 10b transmits light. On the other hand, when the surface 10b functions as the eyepiece optical system, the surface 10b reflects light. Therefore, part of the eyepiece prism 10 is shared by the objective optical system and the eyepiece optical system. Consequently, there is no need to increase the size of the objective prism 5 nor to provide other optical components. This makes it possible to miniaturize the entire viewfinder 100 and to reduce the cost.

Since the viewfinder 100 (300) can be made compact and thin, the optical apparatus, such as a camera, using the viewfinder can also be made compact and thin.

In addition, as shown in FIG. 8, when viewed from the image-taking device 501, the entrance section (objective lens G1) of the objective optical system is disposed directly above the image-taking device 501, and the eyepiece optical system is disposed on the right side. Therefore, the user can easily look through the viewfinder, and the parallax in the optical apparatus is small.

In embodiment 1, although the light from the object is totally reflected twice in the eyepiece prism 10, the light from the object may be reflected at least once. If the shape of the eyepiece prism 10 and the bending prism 6 and the angle of the tilted surfaces of the prisms 10 and 6 are designed optimally so that an erect image can be seen when the user looks through the eyepiece lens 11, the light from the object may be reflected any number of times. Therefore, the eyepiece prism 10 may have at least one reflecting surface that produces a main optical axis not parallel to the main optical axes O1 and O2 entering the objective optical system.

Embodiment 2

In the viewfinder 100 of embodiment 1, the eyepiece lens 11 is tilted toward the eyepiece prism 10. In the viewfinder 200 of embodiment 2, the optical axis entering the eyepiece lens 11 is parallel to the optical axis O1 entering the objective lens G1.

Figure 9:
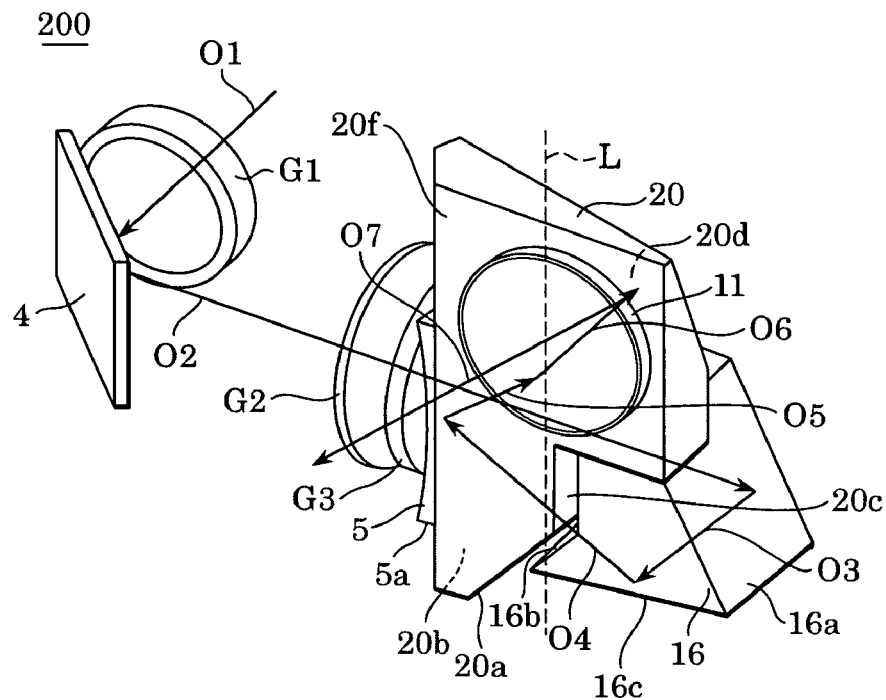
FIG. 9 illustrates a viewfinder according to embodiment 2 of the present invention.
Figure 10:
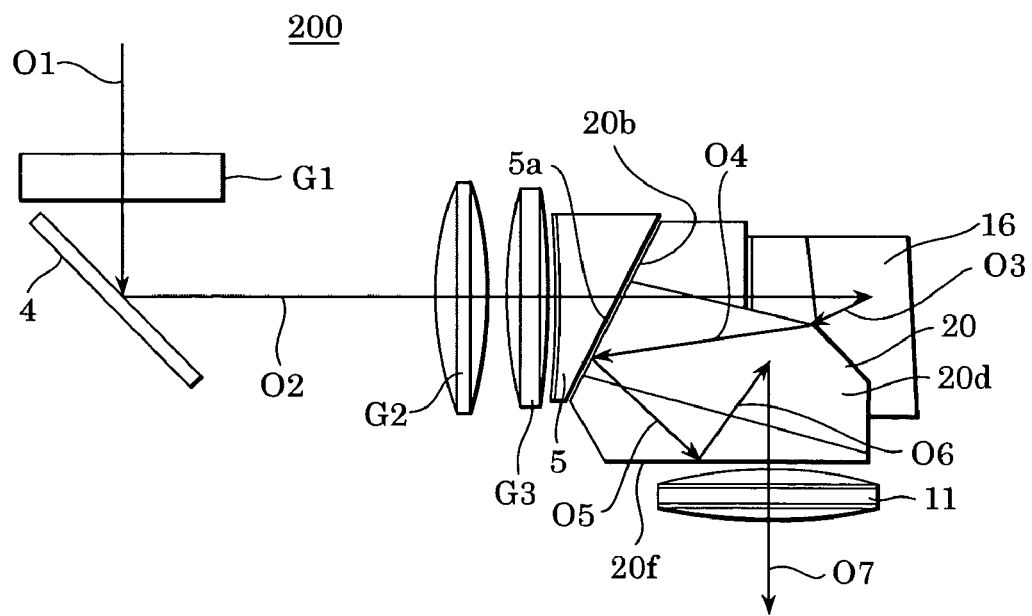
FIG. 10 is a top view showing the viewfinder according to embodiment 2 of the present invention.
Figure 11:
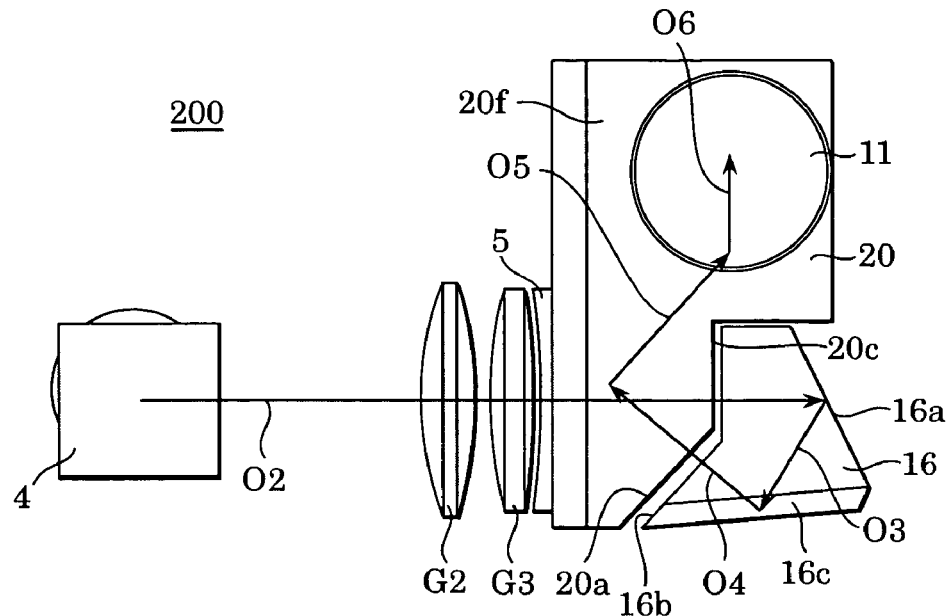
FIG. 11 is a front view showing the viewfinder according to embodiment 2 of the present invention.
Figure 12:
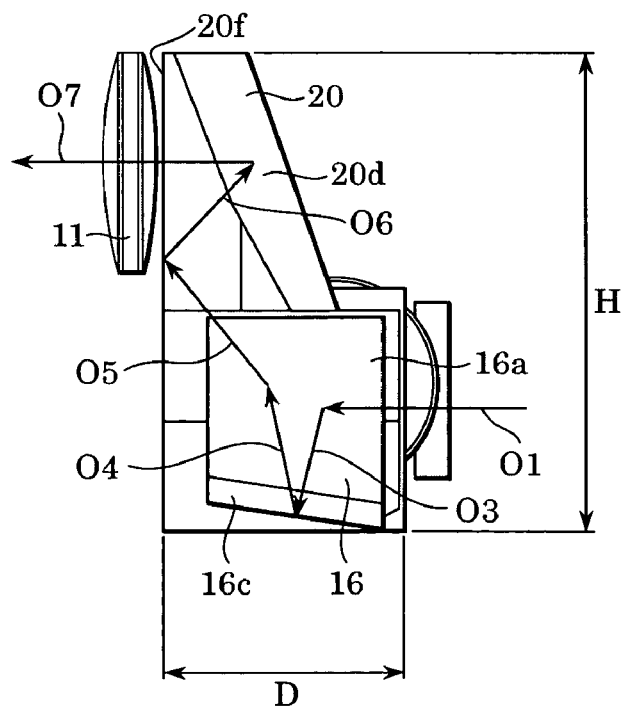
FIG. 12 is a right side view showing the viewfinder according to embodiment 2 of the present invention.

FIGS. 9 to 12 illustrate a viewfinder 200 according to embodiment 2 of the present invention. More specifically, FIG. 9 is a perspective view of the viewfinder in wide-angle mode; FIG. 10 is a top view of the viewfinder; FIG. 11 is a front view of the viewfinder; and FIG. 12 is a right side view of the viewfinder. Incidentally, in the description of embodiment 2, the same reference numerals and characters will be used to designate the same components as those in embodiment 1, so that the description will be omitted. The viewfinder of embodiment 2 is also a zoom viewfinder, as in embodiment 1.

In FIGS. 9 to 12, reference numeral 16 denotes a bending prism having reflecting surfaces 16a and 16c. The bending prism 16 converts the object image into an erect image in cooperation with an eyepiece prism 20. The reflecting surfaces 16a and 16c are metal reflective surfaces evaporated with aluminum. The eyepiece prism 20 composes an eyepiece optical system together with the eyepiece lens 11. The eyepiece prism 20 has a tilted surface 20b that has the same angle as the tilted surface 5a of the objective prism 5. There is a very small air gap between the tilted surfaces 5a and 20b. The plane between the exit surface 16b of the bending prism 16 and the entrance surface 20a of the eyepiece prism 20 is the primary image-forming plane of the objective optical system. The plane is provided with a field frame (not shown).

The optical path may be bent by the mirror 4 in the opposite direction. That is to say, the layout of the above components may be a mirror-image layout symmetrical to the layout in FIG. 9.

Next, with reference to FIGS. 9 to 12, embodiment 2 of the present invention will be described. The light from an object enters the objective lens G1 via a protective window (not shown). Reference character O1 denotes the optical axis at this time. The light from the object exits the objective lens G1 and is then bent by the mirror 4. Reference character O2 denotes the optical axis at this time.

The light from the object bent by the mirror 4 enters the objective lenses G2 and G3, and then enters the objective prism 5. The light from the object entering the objective prism 5 exits through the tilted surface 5a of the objective prism 5, and then enters the eyepiece prism 20 through the tilted surface 20b. As described above, the tilted surfaces 5a and 20b have the same angle, and the air gap between them is very small. Therefore, the light from the object goes approximately straight and enters the eyepiece prism 20 through the tilted surface 20b.

The light from the object entering the eyepiece prism 20 exits through a surface 20c of the eyepiece prism 20, and then enters the bending prism 16. The light from the object is bent by the reflecting surface 16a, and then goes to the reflecting surface 16c. Reference character O3 denotes the optical axis at this time. The object image is vertically inverted by the reflecting surface 16c, and then exits the bending prism 16 through the exit surface 16b. The object image enters the eyepiece prism 20 again through the entrance surface 20a of the eyepiece prism 20 and the field frame (not shown). Reference character O4 denotes the optical axis at this time.

The light from the object again entering the eyepiece prism 20 goes along the optical axis O4 toward the tilted surface 20b. The angle of the bending prism 16 and the angles of the entrance surface 20a and the tilted surface 20b of the eyepiece prism 20 are determined optimally so that the light from the object is totally reflected by the tilted surface 20b. Therefore, all of the light from the object is bent by the tilted surface 20b. Reference character O5 denotes the optical axis at this time.

The light from the object totally reflected by the tilted surface 20b goes to a vertical surface 20f through the eyepiece prism 20. The angle of the tilted surface 20b is determined optimally so that the light from the object is totally reflected by the vertical surface 20f. Therefore, all of the light from the object is bent by the vertical surface 20f. Reference character O6 denotes the optical axis extending toward the tilted surface 20d at this time.

The angle of the tilted surface 20d is determined optimally so that the light from the object is totally reflected by the tilted surface 20d, and the main optical axis of the light from the object is incident on the vertical surface 20f perpendicularly. Therefore, the light from the object totally reflected by the vertical surface 20f is then totally reflected by the tilted surface 20d and goes to the vertical surface 20f. Reference character O7 denotes the optical axis at this time.

The light from the object totally reflected by the tilted surface 20d exits through a vertical surface 20f, and then enters the eyepiece lens 11. Therefore, the user can observe the object image through the eyepiece lens 11.

Here, the optical axes O4, O5, and O6 in the eyepiece prism 20 will be described. As in embodiment 1, the light ray that enters through the center of the objective lens G1 and exits through the center of the eyepiece lens 11 is referred to as the main optical axis. Therefore, the optical axes O1 to O7 are parts of the main optical axis.

Figure 13A:
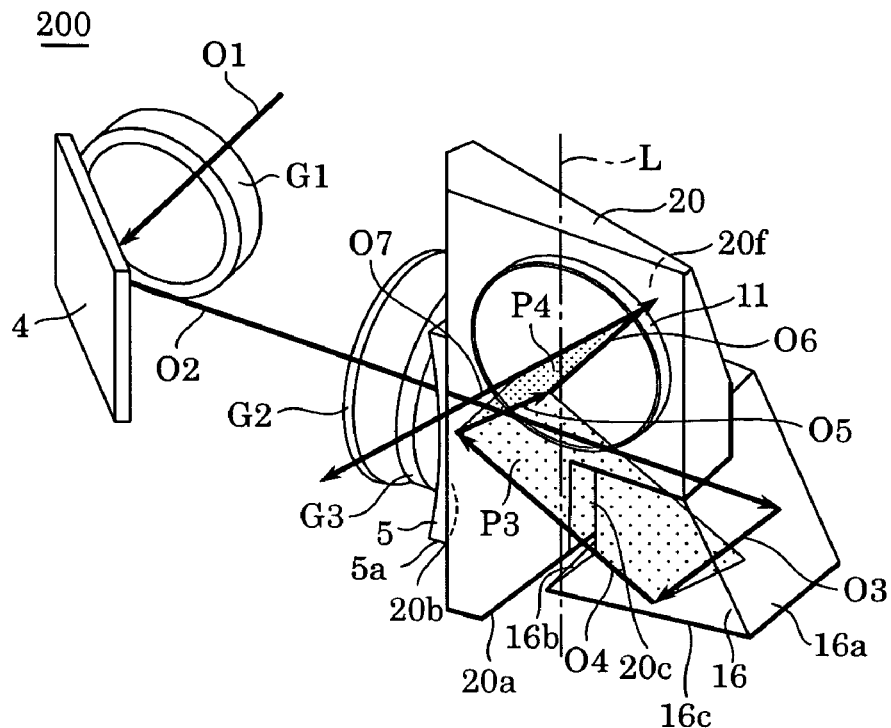
FIGS. 13A and 13B illustrate the relationship between main optical axis entering an objective optical system and planes including main optical axis in an eyepiece prism in embodiment 2 of the present invention.
Figure 13B:
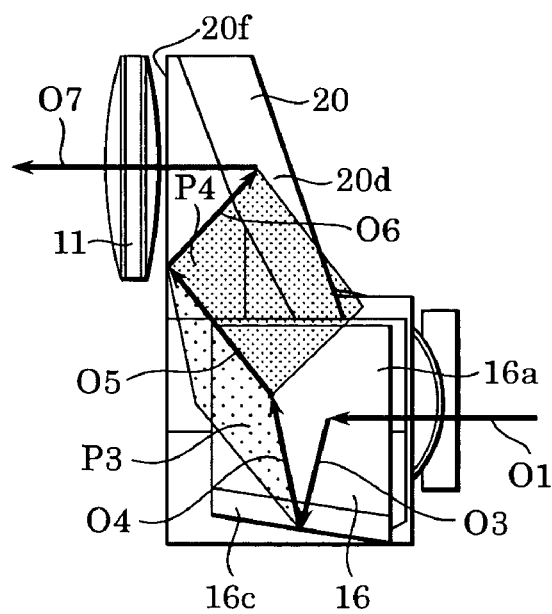

In FIGS. 9 and 10, the axis L is an imaginary axis that extends through the eyepiece prism 20 and is perpendicular to the optical axes O1 and O2. As shown in FIGS. 9 and 10, the optical axes O4, O5, and O6 form a spiral that winds around the axis L in the eyepiece prism 20, and then enter the eyepiece lens 11. In other words, as shown in FIGS. 13A and 13B, when the light from the object is reflected by the tilted surface or the vertical surface of the eyepiece prism 20, the plane including the main axis incident on the tilted surface or the vertical surface and the main axis reflected by the tilted surface or the vertical surface, for example, the plane P3 including the optical axes O4 and O5, is tilted with respect to the optical axes O1 and O2, which enter the objective optical system. That is to say, the plane P3 is not parallel to the optical axes O1 and O2.

The plane P4 including the optical axes O5 and O6 is also tilted with respect to the optical axes O1 and O2.

In the case where the length of the optical path from the field frame (not shown) to the eyepiece lens 11 via the eyepiece prism 20 is a fixed value, spiraling the optical path in the eyepiece prism 20 as described above can reduce the height H and the thickness D (see FIG. 12) of the eyepiece prism 20 compared with folding the optical path in the plane parallel or perpendicular to the optical axes O1 and O2 entering the objective optical system.

As described above, the main optical axis O4 is incident on the surface 20b; the main optical axis O5 is reflected by the surface 20b and is incident on the surface 20f; and the main optical axis O6 is reflected by the surface 20f. Both the plane P3 including the main optical axes O4 and O5 and the plane P4 including the main optical axes O5 and O6 are not parallel to the main axes O1 and O2 entering the objective optical system. In other words, the main axes O4, O5, and O6 incident on and reflected by the reflecting surfaces of the eyepiece prism 20 form a spiral that winds around the imaginary axis L perpendicular to the main axes O1 and O2 entering the objective optical system. Therefore, the height H and the thickness D of the eyepiece prism 20 can be reduced, and consequently the viewfinder according to embodiment 2 is thin and compact.

By optimizing the angles of the tilted surfaces of the eyepiece prism 20, the reflecting surfaces of the eyepiece prism 20 can totally reflect the light from the object. In this case, the reflecting surfaces need not be evaporated with aluminum. Therefore, the cost can be reduced compared with the conventional viewfinders.

When the tilted surface 20b of the eyepiece prism 20 functions as the objective optical system, the tilted surface 20b transmits light. On the other hand, when the surface 20b functions as the eyepiece optical system, the surface 20b reflects light. Therefore, part of the eyepiece prism 20 is shared by the objective optical system and the eyepiece optical system. Consequently, there is no need to increase the size of the objective prism 5 nor to provide other optical components. This makes it possible to miniaturize the entire viewfinder 200 and to reduce the cost.

Since the viewfinder 200 can be made compact and thin, the optical apparatus, such as a camera, using the viewfinder can also be made compact and thin.

In addition, an optical apparatus having the viewfinder 200 is as shown in FIG. 8. When viewed from the image-taking device 501, the entrance section (objective lens G1) of the objective optical system is disposed directly above the image-taking device 501, and the eyepiece optical system is disposed on the right side. Therefore, the user can easily look through the viewfinder, and the parallax in the optical apparatus is small.

In embodiment 2, although the light from the object is totally reflected three times in the eyepiece prism 20, the light from the object may be reflected at least once. If the shape of the eyepiece prism 20 and the bending prism 16 and the angle of the tilted surfaces of the prisms 20 and 16 are designed optimally so that an erect image can be seen when the user looks through the eyepiece lens 11, the light from the object may be reflected any number of times.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical apparatus comprising:
    an optical system for bending an optical path in a first direction into a second direction substantially perpendicular to the first direction; and
    a prism for bending the optical path in the second direction with a plurality of reflecting surfaces so that the optical path spirals in a direction that is not parallel to a plane formed by the first direction and the second direction, and leads into a third direction substantially perpendicular to the second direction,
    wherein a plane formed by a main entering optical axis and a main reflecting optical axis reflecting on the reflecting surfaces is not parallel to the first direction.

2. The optical apparatus according to claim 1, wherein the prism has at least a first surface and a second surface; light from the optical system enters through the first surface; and light reflected by the second surface is reflected by the first surface to be led to the third direction.

3. The optical apparatus according to claim 1, further comprising:
    an image taking section for taking an image of an object;
    a first opening provided on a first side facing the object, and for taking in an image of the object; and
    a second opening provided on a second side opposite from the first side, and for allowing the image taken in from the first opening to exit,
    wherein the image taken in from the first opening enters the optical system; the image from the prism exits through the second opening; and the third direction is substantially perpendicular to thickness direction of the optical apparatus.

* * * * *